(12) United States Patent
Egoshi

(10) Patent No.: US 7,684,906 B2
(45) Date of Patent: Mar. 23, 2010

(54) METHOD OF CONTROLLING HYBRID VEHICLE

(75) Inventor: Teruyoshi Egoshi, Inzai (JP)

(73) Assignees: Hyundai Motor Company, Seoul (KR); Hyundai Motor Japan R&D Center Inc., Inzai, Chiba (JP); Kia Motors Corporation, Seoul (KR)

( * ) Notice: Subject to any disclaimer, the term of this patent is extended or adjusted under 35 U.S.C. 154(b) by 99 days.

(21) Appl. No.: 11/949,417

(22) Filed: Dec. 3, 2007

(65) Prior Publication Data

US 2008/0188997 A1    Aug. 7, 2008

(30) Foreign Application Priority Data

Feb. 6, 2007    (KR) ...................... 10-2007-0012035

(51) Int. Cl.
*G06F 7/00* (2006.01)
(52) U.S. Cl. ...................................................... 701/22
(58) Field of Classification Search .................. 701/22, 701/79, 83, 84, 93, 99, 110, 111, 123; 903/903, 903/905, 906; 180/65.1, 65.21, 65.24, 65.26, 180/65, 265, 65.27, 275, 65.28, 65.285, 65.29, 180/65.31
See application file for complete search history.

(56) References Cited

U.S. PATENT DOCUMENTS 6,166,449 A * 12/2000 Takaoka et al. ........... 290/40 B

FOREIGN PATENT DOCUMENTS

| JP | 2001-268719 | 9/2001 |
|----|-------------|--------|
| JP | 2002-17001  | 1/2002 |
| JP | 2002-51405  | 2/2002 |
| JP | 2002-291104 | 10/2002 |
| JP | 2003-52131  | 2/2003 |

* cited by examiner

*Primary Examiner*—Kim T Nguyen
(74) *Attorney, Agent, or Firm*—Morgan, Lewis & Bockius LLP

(57) ABSTRACT

A method of controlling a hybrid vehicle that is driven by at least one of an engine and a motor generator, the motor generator exchanging power with a battery. The method includes determining whether the vehicle is accelerating, decelerating, or traveling at a constant speed; selecting a range of a state of charge of the battery based on whether the vehicle is accelerating, decelerating, or traveling at a constant speed; and controlling at least one of: torque and number of rotations of the engine and the motor generator, such that the power being exchanged between the battery and the motor generator is such that the state of charge is within the selected range.

1 Claim, 5 Drawing Sheets

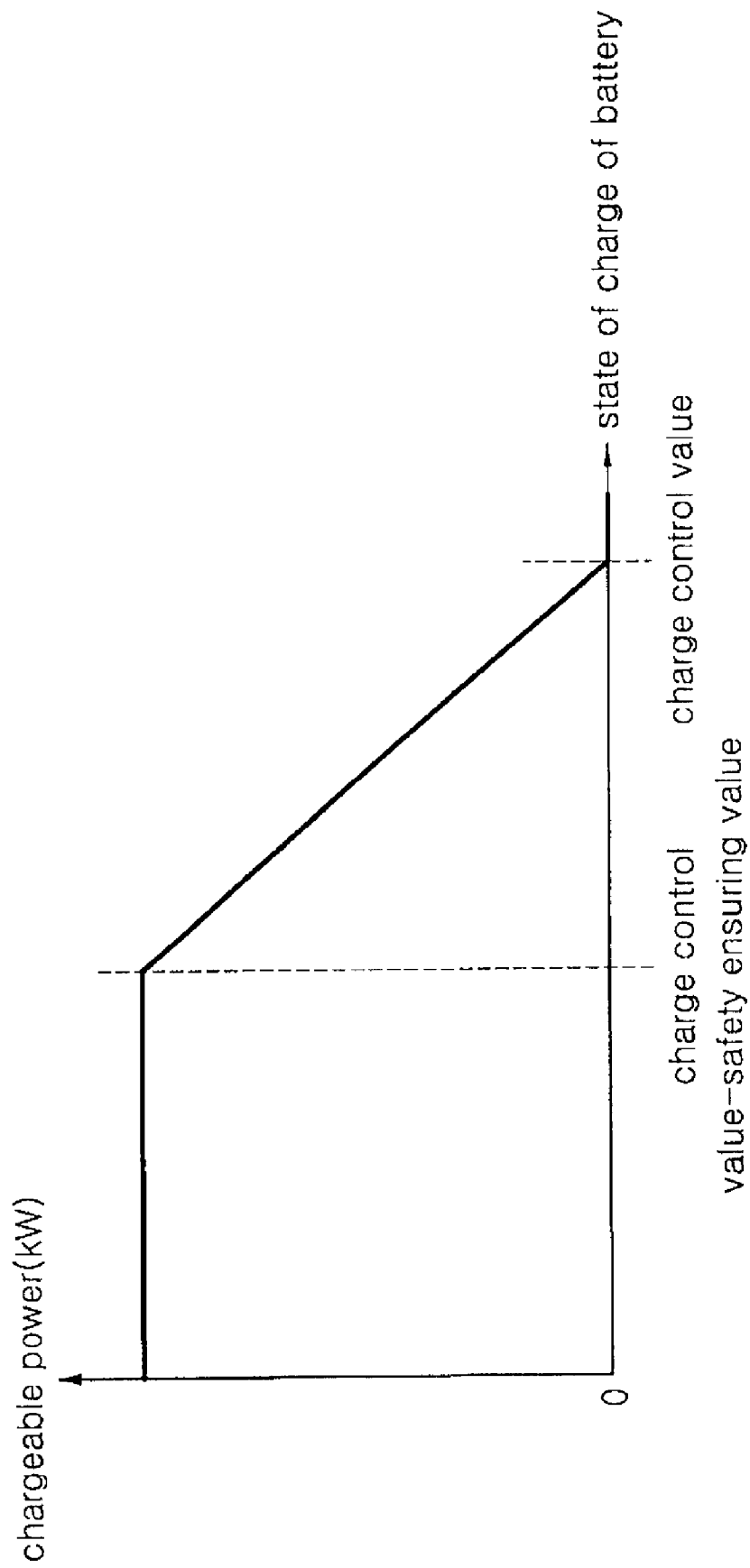

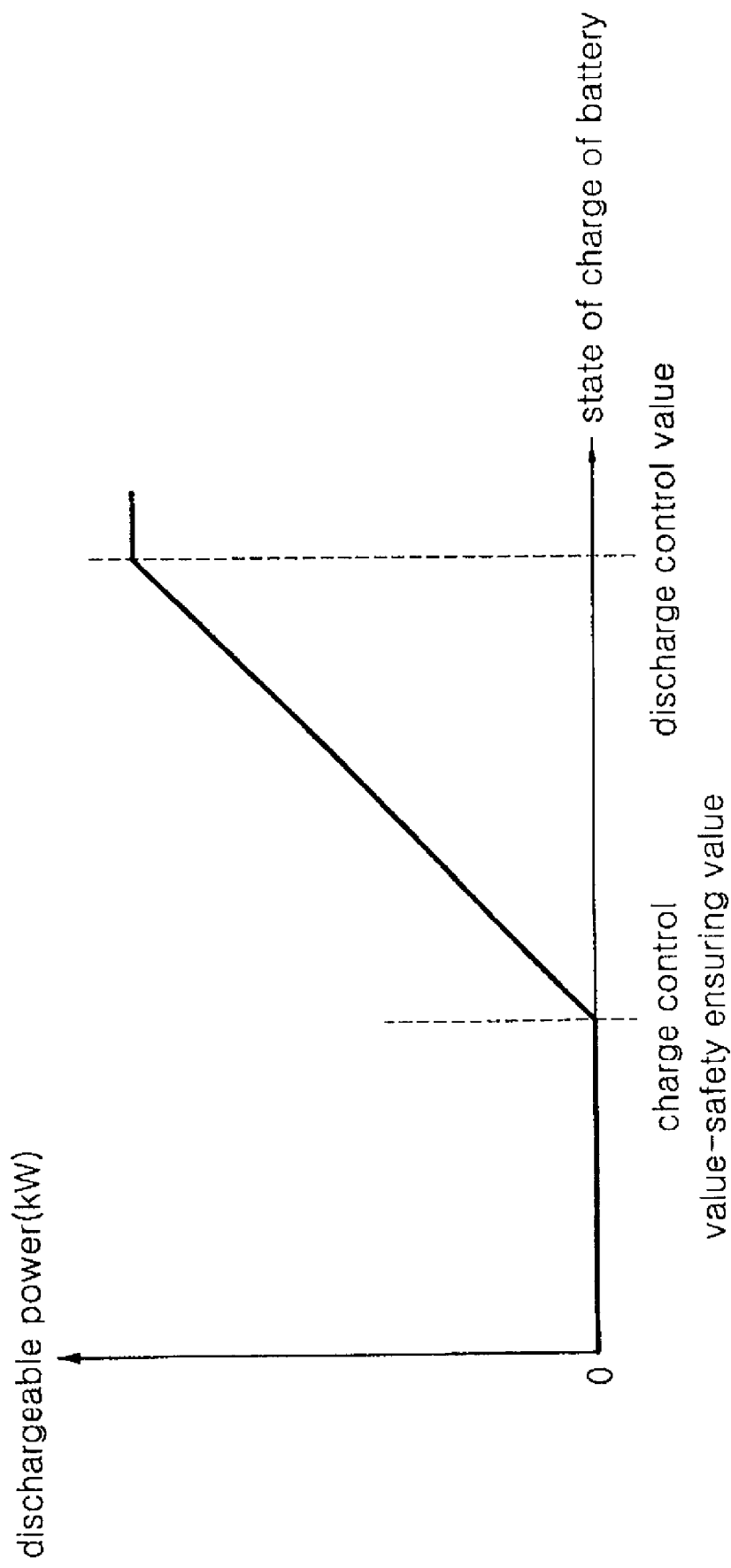

METHOD OF CONTROLLING HYBRID VEHICLE

CROSS-REFERENCE TO RELATED APPLICATIONS

The present application is based on, and claims priority from, Korean Application Serial Number 10-2007-0012035, filed on Feb. 6, 2007, the disclosure of which is hereby incorporated by reference herein in its entirety.

FIELD OF THE INVENTION

The present invention relates to a method of controlling a hybrid vehicle, and more particularly, to a technique that controls an internal combustion engine and a motor generator in a hybrid vehicle, in consideration of a state of charge of a battery.

BACKGROUND OF THE INVENTION

Hybrid vehicles generally use motor generators at slow engine speeds, at which the motor generators have better torque characteristics than internal combustion engines, and use internal combustion engines at moderate to fast speeds, at which the engines have better torque characteristics. This improves fuel efficiency, as the engine is not used at low speeds.

A battery is used to drive the motor generator or store electricity generated by the motor generator. When an SOC (state of charge) of the battery is in an appropriate range, the battery can supply sufficient power to smoothly drive the motor generator and store the electricity generated by the motor generator. If the battery is used when the SOC is not in the appropriate range, it is difficult to control the motor generator to a desired state, and the life of the battery is drastically reduced.

SUMMARY OF THE INVENTION

A method of controlling a hybrid vehicle that is driven by at least one of an engine and a motor generator, the motor generator exchanging power with a battery. The method includes determining whether the vehicle is accelerating, decelerating, or traveling at a constant speed; selecting a range of a state of charge of the battery based on whether the vehicle is accelerating, decelerating, or traveling at a constant speed; and controlling at least one of: torque and number of rotations of the engine and the motor generator, such that the power being exchanged between the battery and the motor generator is such that the state of charge is within the selected range.

It may be determined that the vehicle is decelerating when the sum of a first power, which is determined by creep torque, and a second power, which is determined according to a vehicle speed and an amount of depression of an accelerator pedal, is negative.

Selecting the range of the state of charge of the battery may include setting a lower limit of the range to a first or second value, and setting an upper limit of the range to a third or fourth value. The first value<the second value<the third value<the fourth value.

When the vehicle is decelerating, the upper limit may be set to the fourth value and the lower limit may be set to the second value.

When the vehicle is accelerating or traveling at a constant speed, and an amount of depression of the accelerator pedal is equal to or larger than a reference value, the lower limit may be set to the first value, and the upper limit may be set to the third value.

When the vehicle is accelerating or traveling at a constant speed, and an amount of depression of the accelerator pedal is less than or equal to a reference value, the lower limit may be set to the second value and the upper limit may be set to the third value.

BRIEF DESCRIPTION OF THE DRAWINGS

For a better understanding of the nature and objects of the present invention, reference should be made to the following detailed description with the accompanying drawings, in which:

FIG. 5 is a graph illustrating chargeable power of the battery according to the state of charge of the battery; and FIG. 6 is a graph illustrating dischargeable power of the battery according to the state of charge of the battery.

DETAILED DESCRIPTION OF THE PREFERRED EMBODIMENTS

Hereinafter, preferred embodiments of the present invention will be described with reference to the accompanying drawings.

Figure 1:
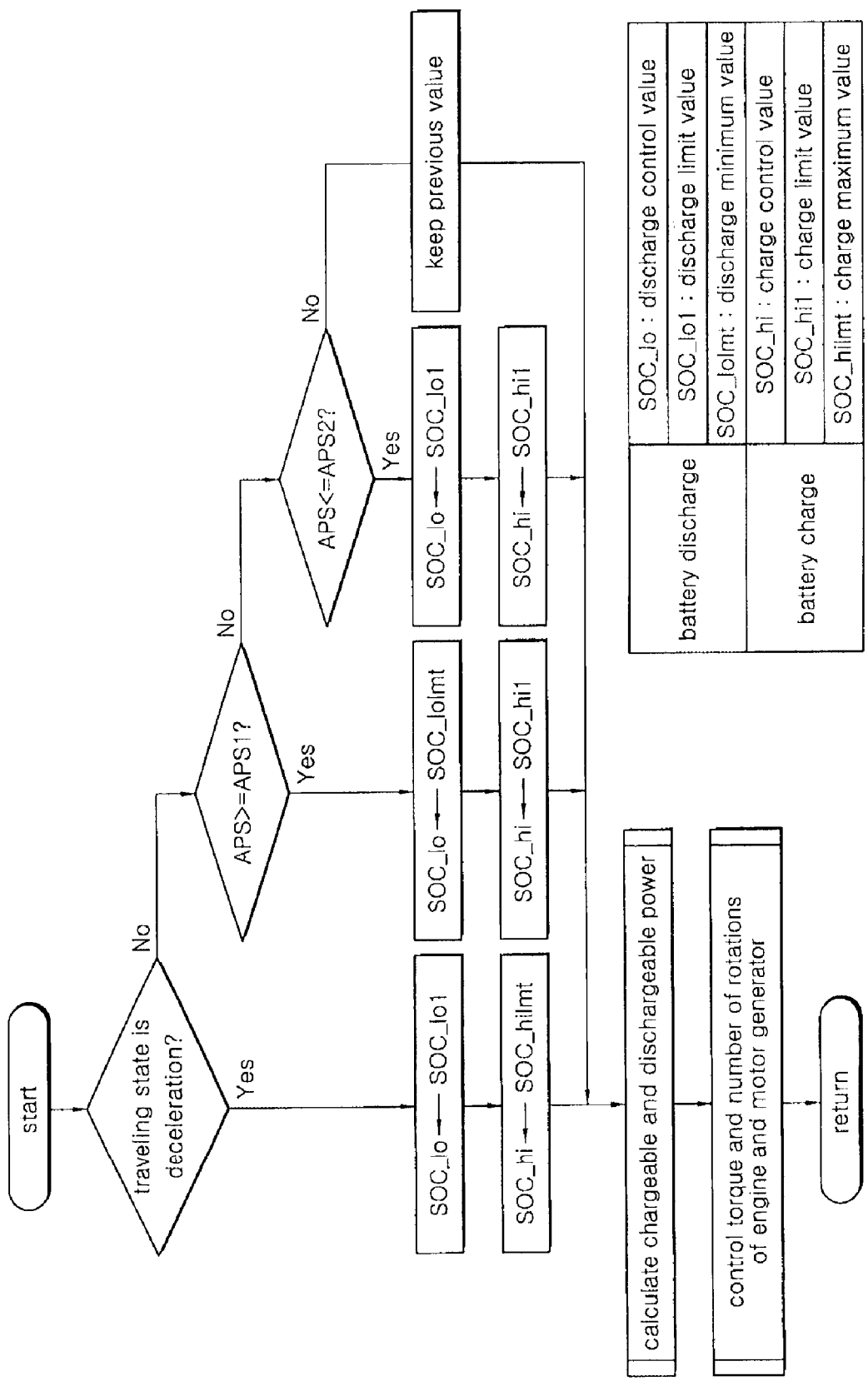
FIG. 1 is a flowchart illustrating a method of controlling a hybrid vehicle according to an embodiment of the present invention.

Referring to FIG. 1, an exemplary method of controlling a hybrid electric vehicle includes adjusting a range of controlling an SOC (state of charge) of the battery according to acceleration and deceleration of the vehicle and the amount of depression of an accelerator pedal APS, calculating chargeable power and dischargeable power of the battery according to the adjusted range of the SOC of the battery, and controlling torque and the number of rotations of the engine and the motor generator such that the power being exchanged between the battery and the motor generator is in a range of the calculated chargeable power and dischargeable power of the battery.

To determine if the vehicle is accelerating or decelerating, a first power, which is determined by creep torque according to a vehicle speed, and a second power, which is determined according to the vehicle speed and the amount of depression of the accelerator pedal, are added together.

Figure 2:
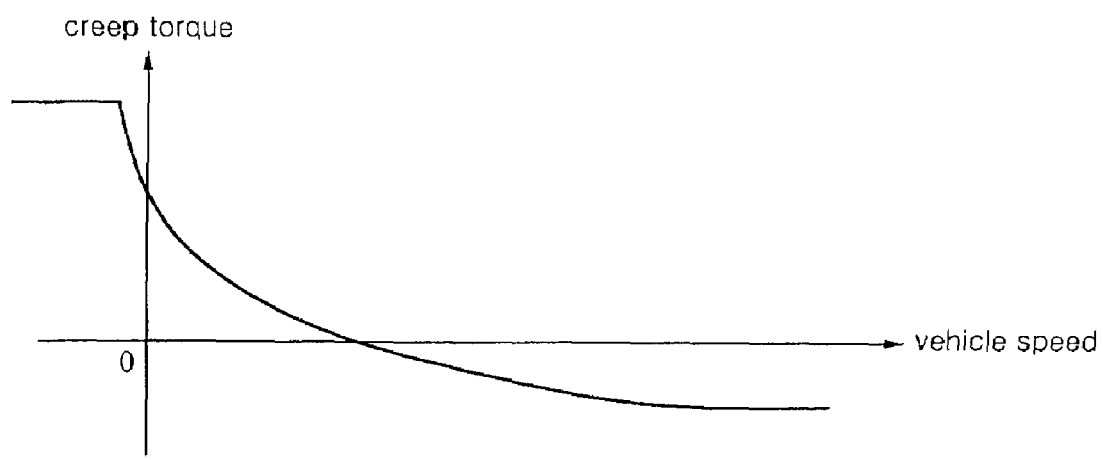
FIG. 2 is a graph illustrating power determined by creep torque according to a vehicle speed.
Figure 3:
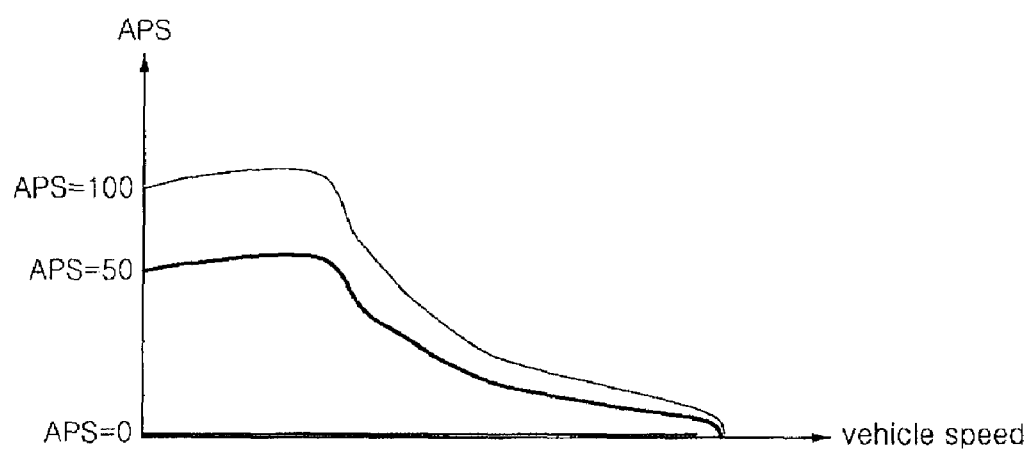
FIG. 3 is a graph illustrating power determined according to the vehicle speed and the amount of depression of an accelerator pedal.

If the second power as shown in FIG. 3 is added to the first power as shown in FIG. 2, it is determined that the vehicle is traveling at a constant speed if the sum is zero, accelerating if the sum is positive, and decelerating if the sum is negative.

If the vehicle is determined to be decelerating, a battery charge control value SOC_hi is set to a battery charge maximum value SOC_hilmt and a battery discharge control value SOC_lo is set to a battery discharge limit value SOC_lo1.

Figure 4:
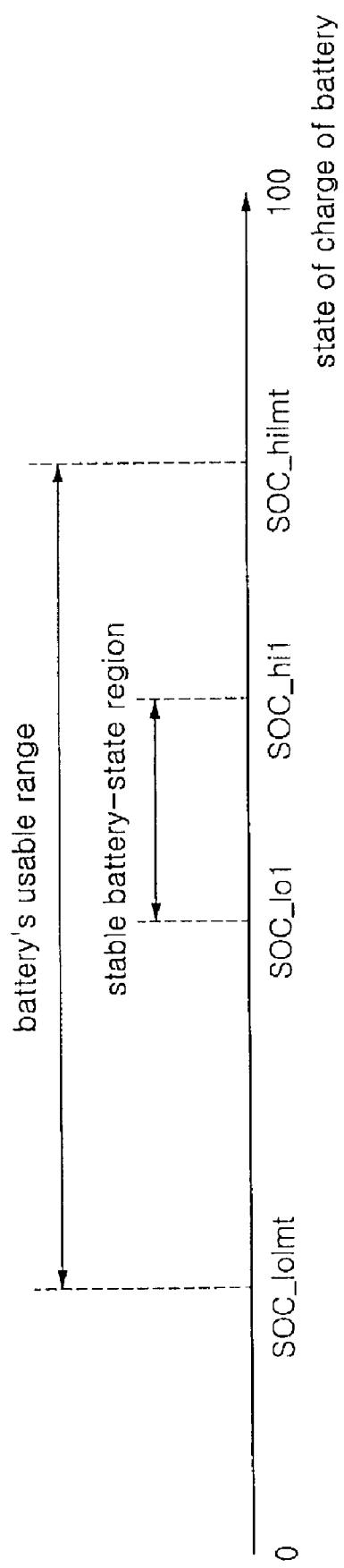
FIG. 4 is a view illustrating a range of a state of charge of a battery.

For example, in FIG. 4, in the range of the SOC of the battery (expressed as a percentage from zero to 100 on the horizontal axis), the "battery's usable range" is shown. The usable range varies with battery type, and is determined according to physical and chemical characteristics of the battery, such as deterioration, ignition, temperature, and internal pressure. Here, the minimum of the battery's usable range is indicated at "SOC_lolmt," and the maximum of the battery's usable range is indicated at "SOC_hilmt." A partial region of the battery's usable range, where a voltage of the battery is almost constant and energy efficiency is high, is indicated at "stable battery-state region." The minimum of the stable battery-state region is indicated at "SOC_lo1" and the maximum of the stable battery-state region is indicated at "SOC_hi1."

As mentioned above, when the vehicle is decelerating, the SOC is controlled to stay between SOC_lo1 and SOC_hilmt, such that the battery can be effectively charged by the regenerative power.

When the vehicle accelerates or travels at a constant speed, determined when the amount of depression of the accelerator pedal is equal to or larger than a first determination value APS1, the battery discharge control value SOC_lo is set to battery discharge minimum value SOC_lolmt and battery charge control value SOC_hi is set to battery charge limit value SOC_hi1.

Here, first determination value APS1 is larger than a second determination value APS2 to be described below. First determination value APS1 and second determination value APS2 are used to generate hysteresis so as to prevent a frequent change of control. First determination value APS1 and second determination value APS2 are determined experimentally or by analysis of the vehicle between a state in which the accelerator pedal is not depressed to a state in which the accelerator pedal is completely depressed.

That is, when the vehicle is not decelerating and amount of depression of the accelerator pedal APS is equal to or larger than first determination value APS1, the vehicle may be accelerating, which requires a large driving force. Here, SOC of the battery is set to be between SOC_lolmt and SOC_hi1. In this way, the motor generator is driven by the battery, thereby increasing a possibility that the motor generator generates the required driving force.

When amount of depression of the accelerator pedal APS is less than or equal to the second determination value APS2, a range of controlling the SOC of the battery when the vehicle accelerates or travels at the constant speed is determined by setting the battery discharge control value SOC_lo to SOC_lo1, and the battery charge control value SOC_hi to SOC_hi1.

That is, when the vehicle is not decelerating and the amount of depression of the accelerator pedal APS is less than or equal to the second determination value APS2, the vehicle may be traveling at a constant speed, which does not require a large driving force. Here, the SOC is set between SOC_hi1 and SOC_lo1, i.e. in the stable battery-state region. In this way, the battery is efficiently used, thereby increasing fuel efficiency of the vehicle and controlling the vehicle to a state favorable to securing the life of the battery.

When the vehicle is not decelerating and amount of depression of the accelerator pedal APS is between first determination value APS1 and second determination value APS2, the range of controlling the SOC of the battery remains according to the previous determination result, providing hysteresis and preventing frequent changes in the range of controlling the SOC.

According to a method of calculating the chargeable power of the battery according to the range of the SOC of the battery, as shown in FIG. 5, a value of the chargeable power corresponding to the battery charge control value set according to the acceleration and deceleration of the vehicle and the amount of depression of the accelerator pedal is calculated on the basis of a map in which the chargeable power, which gradually decreases as a percentage of the SOC of the battery increases, is determined and stored.

Further, according to a method of calculating the dischargeable power of the battery according to the range of the SOC of the battery, as shown in FIG. 6, a value of the dischargeable power corresponding to the battery discharge control value set according to the acceleration and deceleration of the vehicle and the amount of depression of the accelerator pedal is calculated on the basis of a map in which the dischargeable power, which gradually increases as a percent of the SOC of the battery increases, is determined and stored.

A controller of the hybrid vehicle controls the torque and the number of rotations of the engine and the motor generator, such that the power being exchanged between the motor generator and the battery is in a range of the chargeable power and the dischargeable power that are calculated as described above, in consideration of the above calculated chargeable power and dischargeable power of the battery. Therefore, it is possible to sufficiently charge regenerative power when the hybrid vehicle is decelerating, improve responsiveness to acceleration and large load of the vehicle by causing the motor generator to sufficiently generate power when the vehicle is accelerating, and operate the battery at its highest efficiency range when the vehicle travels at a constant speed. Accordingly, fuel efficiency of the vehicle is improved, and it is possible to effectively prevent shortening of the life of the battery.

Although preferred embodiments of the present invention have been disclosed for illustrative purposes, those skilled in the art will appreciate that various modifications, additions and substitutions are possible, without departing from the scope and spirit of the present invention as defined in the accompanying claims.

What is claimed is:

1. A method of controlling a hybrid vehicle that is driven by at least one of an engine and a motor generator, the motor generator exchanging power with a battery, the method comprising:

determining whether the vehicle is accelerating, decelerating, or traveling at a substantially constant speed;

selecting a range of a state of charge of the battery based on whether the vehicle is accelerating, decelerating, or traveling at the substantially constant speed; and controlling at least one of: torque and number of rotations of the engine and the motor generator, such that the power being exchanged between the battery and the motor generator is such that the state of charge is within the selected range;

wherein determining whether the vehicle is accelerating, decelerating, or traveling at the substantially constant speed comprises determining that the vehicle is decelerating when the sum of a first power, which is determined by creep torque, and a second power, which is determined according to a vehicle speed and an amount of depression of an accelerator pedal, is negative;

wherein selecting the range of the state of charge of the battery comprises setting a lower limit of the range to a first or second value and setting an upper limit of the range to a third or fourth value, wherein the first value<the second value<the third value<the fourth value;

wherein when the vehicle is decelerating, the upper limit is set to the fourth value;

wherein when the vehicle is decelerating, the lower limit is set to the second value;

wherein when the vehicle is accelerating or traveling at the substantially constant speed and an amount of depression of the accelerator pedal is equal to or larger than a reference value, the lower limit is set to the first value;

wherein when the vehicle is accelerating or traveling at the substantially constant speed and an amount of depression of the accelerator pedal is equal to or larger than a reference value, the upper limit is set to the third value;

wherein when the vehicle is accelerating or traveling at the substantially constant speed and an amount of depression of the accelerator pedal is less than or equal to a reference value, the lower limit is set to the second value; and wherein when the vehicle is accelerating or traveling at the substantially constant speed and an amount of depression of the accelerator pedal is less than or equal to a reference value, the upper limit is set to the third value.

* * * * *